United States Patent
Hara

(10) Patent No.: US 9,446,464 B2
(45) Date of Patent: Sep. 20, 2016

(54) WIRE DISCHARGE MACHINING APPARATUS WITH GRAPHICAL WIRE LENGTH DISPLAY

(71) Applicant: Mitsubishi Electric Corporation, Chiyoda-ku, Tokyo (JP)

(72) Inventor: Masayuki Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 342 days.

(21) Appl. No.: 14/357,187

(22) PCT Filed: Jul. 26, 2013

(86) PCT No.: PCT/JP2013/070372
§ 371 (c)(1),
(2) Date: May 8, 2014

(87) PCT Pub. No.: WO2015/011833
PCT Pub. Date: Jan. 29, 2015

(65) Prior Publication Data
US 2015/0202701 A1  Jul. 23, 2015

(51) Int. Cl.
*B23H 1/02* (2006.01)
*G05B 19/18* (2006.01)
(Continued)

(52) U.S. Cl.
CPC ......... *B23H 1/02* (2013.01); *B23H 7/02* (2013.01); *B23H 11/00* (2013.01); *G05B 19/182* (2013.01); *G05B 19/188* (2013.01); *B23H 7/20* (2013.01)

(58) Field of Classification Search
None
See application file for complete search history.

(56) References Cited

U.S. PATENT DOCUMENTS

| 4,495,038 A | * | 1/1985 | Inoue | B23H 7/065 204/202 |
| 4,581,514 A | | 4/1986 | Inoue | |

(Continued)

FOREIGN PATENT DOCUMENTS

| JP | 57-85095 U | 5/1982 |
| JP | 58-188126 U | 12/1983 |
| JP | 63-283824 A | 11/1988 |

(Continued)

OTHER PUBLICATIONS

International Search Report for PCT/JP2013/070372 dated Oct. 15, 2013.
Written Opinion of PCT/JP2013/070372 dated Oct. 15, 2013.

*Primary Examiner* — Mohammad Ali
*Assistant Examiner* — Bernard G Lindsay
(74) *Attorney, Agent, or Firm* — Sughrue Mion, PLLC

(57) ABSTRACT

A wire discharge machining apparatus includes a numerical control unit carrying out numerical control of the wire discharge machining apparatus according to a machining program and a display unit displaying information concerning machining of the workpiece by the wire discharge machining apparatus. The numerical control unit includes a wire-remaining-length calculating unit calculating a length of the wire remaining in a wire bobbin attached to the wire discharge machining apparatus and a wire-consumed-length calculating unit calculating an estimated length of the wire used for machining of the workpiece. The display unit displays, as a graphic, information concerning a remaining length that is a calculation result in the wire-remaining-length calculating unit and information concerning an estimated consumed length that is a calculation result in the wire-consumed-length calculating unit, and adds information representing a progress of a machining stage to the information concerning the estimated consumed length.

3 Claims, 10 Drawing Sheets

(51) Int. Cl.
   *B23H 7/02*   (2006.01)
   *B23H 11/00*  (2006.01)
   *B23H 7/20*   (2006.01)

(56) References Cited

U.S. PATENT DOCUMENTS

| | | | | |
|---|---|---|---|---|
| 4,689,457 | A * | 8/1987 | Izumiya | B23H 7/10 |
| | | | | 219/69.12 |
| 5,072,089 | A | 12/1991 | Higashi | |
| 5,514,941 | A * | 5/1996 | Kita | B23H 7/04 |
| | | | | 318/569 |
| 5,756,954 | A * | 5/1998 | Kamiguchi | B23H 7/065 |
| | | | | 219/69.12 |
| 2011/0100959 | A1 * | 5/2011 | Onodera | B23H 7/065 |
| | | | | 219/69.13 |

FOREIGN PATENT DOCUMENTS

| | | |
|---|---|---|
| JP | 01-264722 A | 10/1989 |
| JP | 02-41821 A | 2/1990 |
| JP | 2-279219 A | 11/1990 |
| JP | 4-82620 A | 3/1992 |
| JP | 04-82621 A | 3/1992 |
| JP | 2000-237921 A | 9/2000 |
| JP | 2003-025155 A | 1/2003 |

* cited by examiner

WIRE DISCHARGE MACHINING APPARATUS WITH GRAPHICAL WIRE LENGTH DISPLAY

CROSS REFERENCE TO RELATED APPLICATIONS

This application is a National Stage of International Application No. PCT/JP2013/070372 filed Jul. 26, 2013, the contents of all of which are incorporated herein by reference in their entirety.

FIELD

The present invention relates to a wire discharge machining apparatus.

BACKGROUND

In a wire discharge machining apparatus, there has been proposed a technology for accurately grasping the remaining quantity of a wire in a wire bobbin and the consumption of the wire by discharge machining. By grasping the remaining quantity and the consumption of the wire, an operator can replace the wire bobbin before machining is suspended because of the insufficiency of the wire.

For example, Patent Literatures 1 and 2 propose technologies for calculating the remaining quantity of the wire from the weight of the wire bobbin and calculating a predicted machining length for a workpiece. Data obtained by the calculation is used in a replacement command for the wire bobbin and displayed on a display.

Patent Literature 3 proposes a technology for comparing the remaining quantity of a wire calculated from the rotating speed of a wire bobbin and the wire consumption of the entire program calculated from the wire consumption for each of the machining conditions and specifying a part where the wire runs out in a machining path.

Patent Literature 4 proposes a technology of a wire remaining quantity display apparatus for converting the measurement result of the wire weight into the wire length and displaying the obtained result. Patent Literature 5 proposes a technology for comparing the cumulative value of the wire consumption for each of the machining levels of the machining shapes and the remaining quantity of a wire and determining the available machining level.

CITATION LIST

Patent Literature

Patent Literature 1: Japanese Patent Application Laid-Open No. H4-082620
Patent Literature 2: Japanese Patent Application Laid-Open No. H4-082621
Patent Literature 3: Japanese Patent Application Laid-Open No. 2003-025155
Patent Literature 4: Japanese Patent Application Laid-Open No. S63-283824
Patent Literature 5: Japanese Patent Application Laid-Open No. H2-041821

SUMMARY

Technical Problem

Even if information concerning the remaining quantity of a wire and information concerning the consumption of the wire obtained by the related art are simply presented as data, in some case, it is difficult to determine in which machining stage a wire bobbin should be replaced in order to use the wire without insufficiency and without waste.

The present invention has been devised in view of the above and it is an object of the present invention to obtain a wire discharge machining apparatus capable of preventing machining from being suspended because of the insufficiency of a wire and using a wire without waste by clearly indicating the timing for replacing a wire bobbin to an operator.

Solution to Problem

In order to solve the above problems and achieve the object, the present invention is a wire discharge machining apparatus that causes an electric discharge between a wire and a workpiece and machines the workpiece, including a numerical control unit that carries out numerical control of the wire discharge machining apparatus according to a machining program; and a display unit that displays information concerning machining of the workpiece by the wire discharge machining apparatus, wherein the numerical control unit includes a wire-remaining-length calculating unit that calculates a length of the wire remaining in a wire bobbin attached to the wire discharge machining apparatus, and a wire-consumed-length calculating unit that calculates an estimated length of the wire used for machining of the workpiece, and the display unit displays, as a graphic, information concerning a remaining length that is a calculation result in the wire-remaining-length calculating unit and information concerning an estimated consumed length that is a calculation result in the wire-consumed-length calculating unit, and adds information representing a progress of a machining stage to the information concerning the estimated consumed length.

Advantageous Effects of Invention

The wire discharge machining apparatus according to the present invention clearly indicates the information concerning the remaining length and the information concerning the estimated consumed length of the wire together with the information representing the progress of the machining stages. An operator can easily determine, by viewing the display by the display unit, in which machining stage a wire bobbin should be replaced. Accordingly, the wire discharge machining apparatus can attain an effect that it is possible to prevent machining from being suspended because of the insufficiency of the wire and use the wire without waste by clearly indicating the timing for replacing the wire bobbin to the operator.

DESCRIPTION OF EMBODIMENTS

Embodiments of a wire discharge machining apparatus according to the present invention are explained in detail below with reference to the drawings. Note that the present invention is not limited by the embodiments.

First Embodiment

Figure 1:
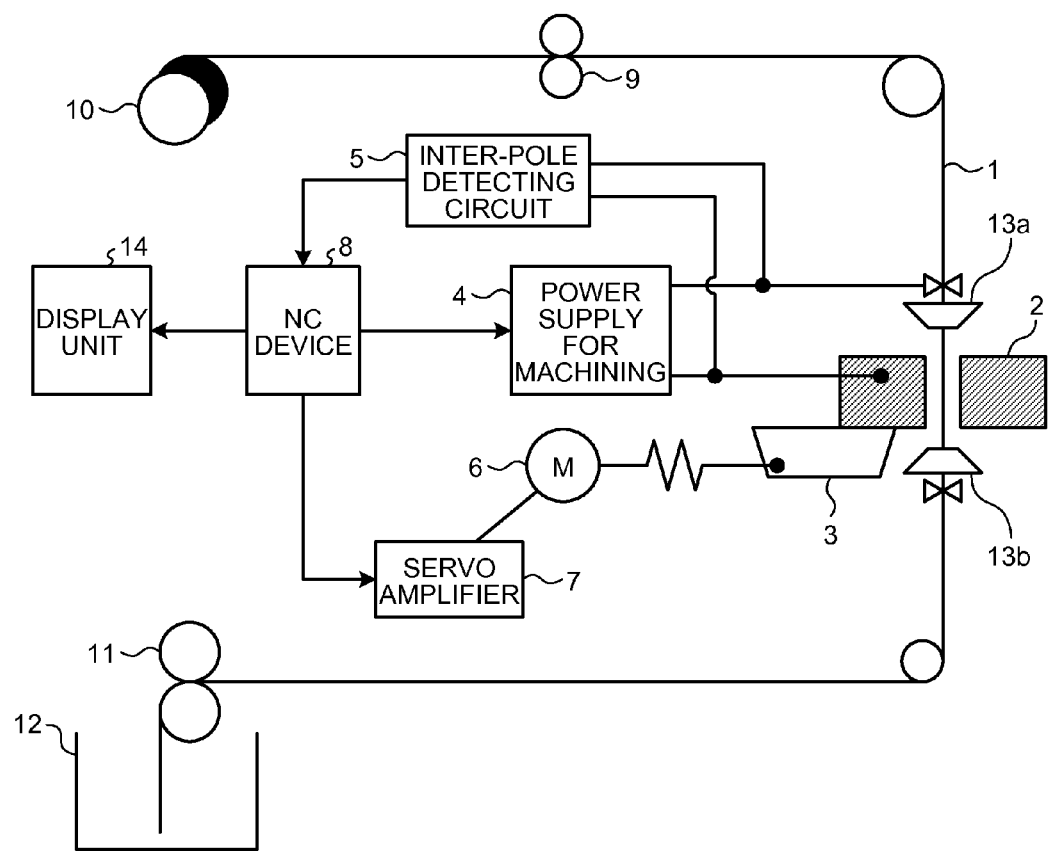
FIG. 1 is a diagram of the schematic configuration of a wire discharge machining apparatus according to a first embodiment of the present invention.

FIG. 1 is a diagram of the schematic configuration of a wire discharge machining apparatus according to a first embodiment of the present invention. The wire discharge machining apparatus causes an electric discharge between a wire 1 and a workpiece 2 and machines the workpiece 2.

The wire discharge machining apparatus includes a table 3, a power supply for machining 4, an inter-pole detecting circuit 5, a servo motor 6, a servo amplifier 7, an NC device 8, a tension applying mechanism (a tension roller) 9, a wire travelling device (a collection roller) 11, a wire collection container 12, machining liquid nozzles 13a and 13b, and a display unit 14.

The workpiece 2 is fixed to the table 3 and moves together with the table 3. The inter-pole detecting circuit 5 detects an inter-pole average voltage during machining. The servo motor 6 moves the table 3. The servo amplifier 7 controls driving of the servo motor 6. The NC device 8, which is a numerical control unit, carries out numerical control of the wire discharge machining apparatus according to a machining program. The display unit 14 displays, on a display, information concerning machining of the workpiece 2 by the wire discharge machining apparatus.

The power supply for machining 4 supplies a machining current between the wire 1 and the workpiece 2. The wire discharge machining apparatus causes an electric discharge between the wire 1 and the workpiece 2 to thereby advance machining of the workpiece 2. The wire discharge machining apparatus moves the table 3 according to the machining program to machine the workpiece 2 into a desired shape.

The servo motor 6 changes the moving speed of the table 3 according to the inter-pole state detected by the inter-pole detecting circuit 5. The servo motor 6 increases the moving speed when the inter-pole gap is wide and reduces the moving speed when the inter-pole gap is narrow. Accordingly, the wire discharge machining apparatus can prevent contact of the wire 1 and the workpiece 2 and maintain an optimum interval for machining. The NC device 8 grasps the interval between the wire 1 and the workpiece 2 based on the average voltage during machining. In general, the NC device 8 controls the moving speed of the table 3 such that the inter-pole average voltage coincides with a predetermined target value.

The tension applying mechanism 9 applies a predetermined tension to the wire 1 paid out from a wire bobbin 10. The machining liquid nozzle 13a ejects machining liquid from the upper side of the workpiece 2. The machining liquid nozzle 13b ejects the machining liquid from the lower side of the workpiece 2. The wire collection container 12 collects the wire 1 after being used for machining. The wire travelling device 11 tows the wire 1 near the wire collection container 12 to cause the wire 1 to travel on a wire path from the wire bobbin 10 to the wire collection container 12.

The wire bobbin 10 is attached to the wire discharge machining apparatus. The wire 1 wound on the wire bobbin 10 is paid out from the wire bobbin 10 by the driving by the wire travelling device 11. The wire bobbin 10 attached to the wire discharge machining apparatus is replaceable.

Figure 2:
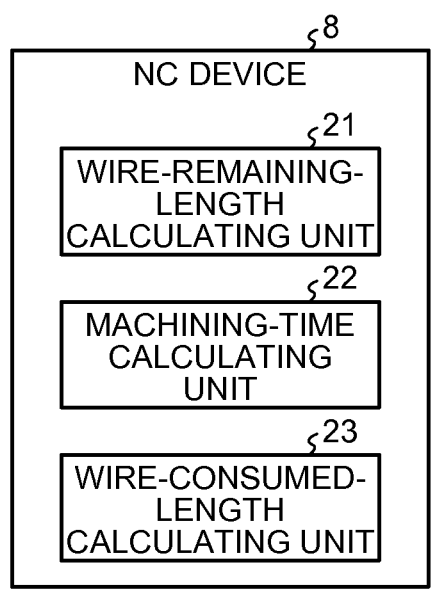
FIG. 2 is a block diagram of the schematic configuration of an NC device.

FIG. 2 is a block diagram of the schematic configuration of the NC device. The NC device 8 includes a wire-remaining-length calculating unit 21, a machining-time calculating unit 22, and a wire-consumed-length calculating unit 23.

The wire-remaining-length calculating unit 21 calculates the length of the wire 1 remaining in the wire bobbin 10 attached to the wire discharge machining apparatus. The machining-time calculating unit 22 calculates the time required for machining of the workpiece 2. The wire-consumed-length calculating unit 23 calculates the estimated length of the wire 1 used for the machining of the workpiece 2.

Figure 3:
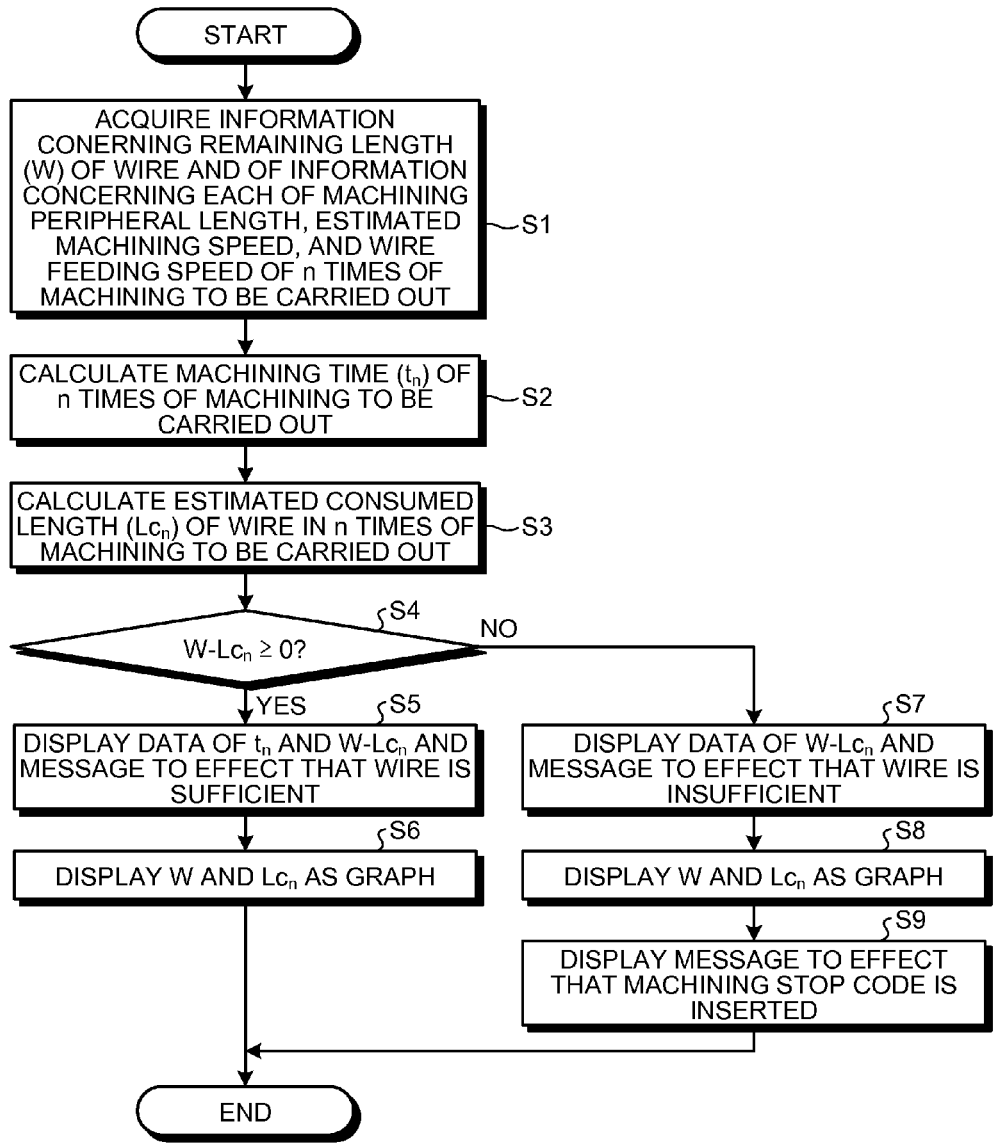
FIG. 3 is a flowchart explaining the operation of the wire discharge machining apparatus according to the first embodiment.

FIG. 3 is a flowchart explaining the operation of the wire discharge machining apparatus according to the first embodiment. At step S1, the NC device 8 acquires information concerning the remaining length (W) of the wire 1 in the wire bobbin 10. The NC device 8 acquires, concerning each of the stages of n times of machining to be carried out, information concerning each of the machining peripheral length ($l_n$), the estimated machining speed ($s_n$), and the wire feeding speed ($ws_n$). The n times of machining indicates that machining is performed n times on the same part of the workpiece 2 while changing the machining conditions.

The NC device 8 calculates the remaining length of the wire 1 in the wire-remaining-length calculating unit 21. The wire-remaining-length calculating unit 21 may calculate the remaining length using any method. The NC device 8 acquires information concerning each of the estimated machining speed and the wire feeding speed based on the machining conditions in each stage.

At step S2, the machining-time calculating unit 22 calculates the machining time ($t_n$) of the n times of machining to be carried out. The machining-time calculating unit 22 calculates $t_n$ according to, for example, Formula 1 described below.

$$t_n = \Sigma(l_n/s_n) \quad (1)$$

At step S3, the wire-consumed-length calculating unit 23 calculates the wire consumed length ($Lc_n$) of the n times of machining to be carried out. The wire-consumed-length calculating unit 23 calculates $Lc_n$ according to, for example, Formula (2) described below. Note that the wire consumed length is also referred to as "estimated consumed length" as appropriate. The wire-consumed-length calculating unit 23 calculates the estimated consumed length based on the machining peripheral length, the estimate machining speed, and the wire feeding speed in each machining stage.

$$Lc_n = \Sigma\{(l_n/s_n) \times ws_n\} \quad (2)$$

At step S4, the NC device 8 determines, based on a condition indicated by Formula (3) described below, whether the wire 1 is sufficient in the n times of machining to be carried out.

$$W - Lc_n \geq 0 \quad (3)$$

When Formula (3) is satisfied (Yes at step S4), the NC device 8 sends, to the display unit 14, data of $t_n$ and $W-Lc_n$ and the determination result indicating that the wire 1 is sufficient. At step S5, the display unit 14 displays the data of $t_n$ and $W-Lc_n$ and a message to the effect that the wire 1 is sufficient. Further, at step S6, the display unit 14 displays the information concerning each of W and $Lc_n$, for example, as a graph.

When Formula (3) is not satisfied, that is, when $W-Lc_n<0$ (No at step S4), the NC device 8 sends, to the display unit 14, the data of $W-Lc_n$ and the determination result indicating that the wire 1 is insufficient. At step S7, the display unit 14 displays the data of $W-Lc_n$ and a message to the effect that the wire 1 is insufficient. Further, at step S8, the display unit 14 displays the information concerning each of W and $Lc_n$, for example, as a graph.

FIG. 4 to FIG. 7 are diagrams of examples of display on the display unit. The display unit 14 displays, as graphics, information concerning the remaining length that is the calculation result in the wire-remaining-length calculating unit 21 and information concerning the estimated consumed length that is the calculation result in the wire-consumed-length calculating unit 23. In this embodiment, the display unit 14 displays the information concerning the remaining length of the wire 1 and the information concerning the estimated consumed length as a table of numerical data and a bar graph.

The display unit 14 adds information representing the progress of the machining stages to the information concerning the estimated consumed length. In this embodiment, the display unit 14 displays, on the bar graph representing the estimated consumed length, classification indicating which number of machining is being performed. The display unit 14 may indicate, for example, by applying color coding, which number of machining is being performed. Note that "wire bobbin ID" shown in FIG. 4 to FIG. 7 is identification information given to each of the wire bobbins 10.

Figure 4:
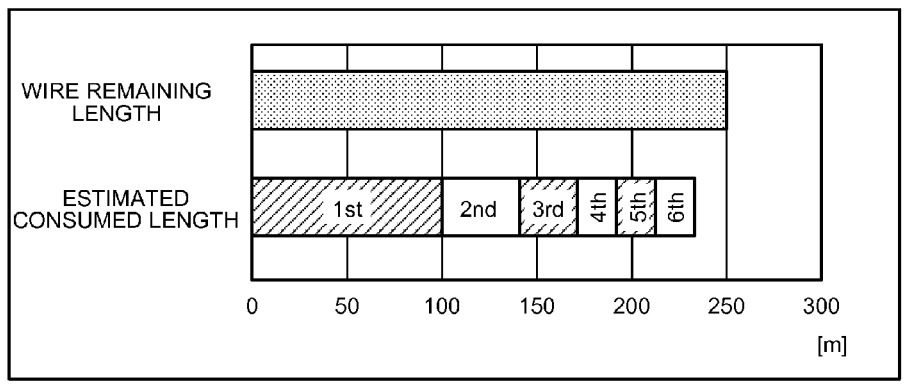
FIG. 4 is a diagram of an example of display on a display unit (No. 1).
Figure 5:
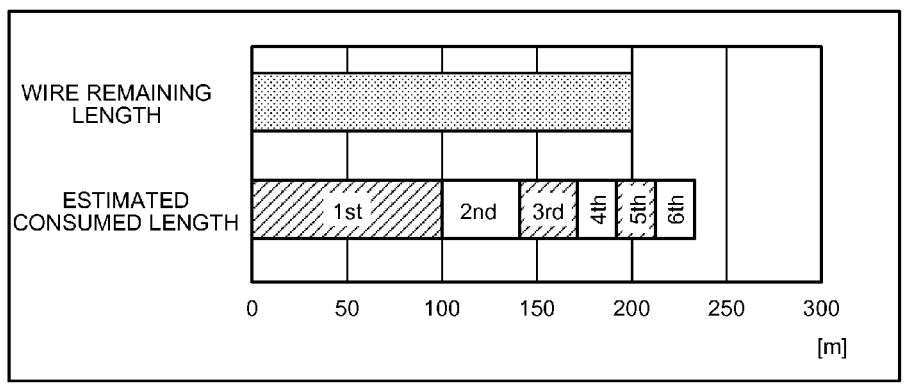
FIG. 5 is a diagram of an example of display on the display unit (No. 2).

In FIG. 4 and FIG. 5, display examples are shown in which six times of machining from the first (1st) machining to the sixth (6th) machining are carried out for a certain single shape. In the example shown in FIG. 4, the remaining length is 250 meters and the total of the estimated consumed lengths in the six times of machining is 230 meters. In this example, Formula (3) is satisfied. The wire 1 is sufficient in the six times of machining to be carried out.

In the example shown in FIG. 5, the remaining length is 200 meters and the total of the estimated consumed lengths in the six times of machining is 230 meters. In this example, Formula (3) is not satisfied. The wire 1 is insufficient in the six times of machining to be carried out. From the display shown in FIG. 5, it is seen that the wire 1 runs out during the fifth (5th) machining. From such display, an operator can recognize that, if the wire bobbin 10 is replaced at a point when the fourth machining ends, suspension of the machining due to the insufficiency of the wire 1 can be avoided and waste of the wire 1 is the smallest.

Figure 6:
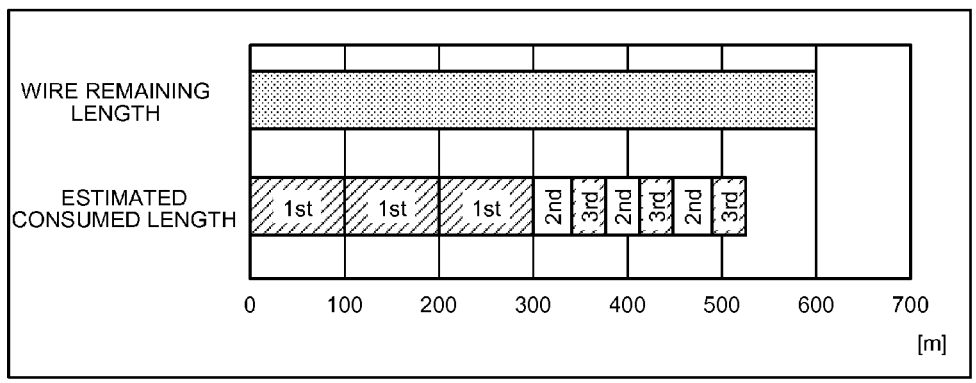
FIG. 6 is a diagram of an example of display on the display unit (No. 3).
Figure 7:
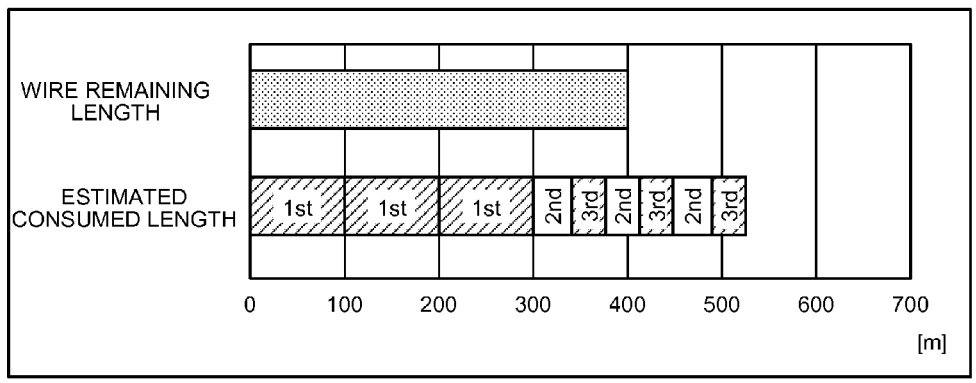
FIG. 7 is a diagram of an example of display on the display unit (No.4).

FIG. 6 and FIG. 7 are examples concerning machining of a plurality of shapes. In FIG. 6 and FIG. 7, display examples are shown in which three times of machining from the first (1st) machining to the third (3rd) machining are carried out for each of certain three shapes. The wire discharge machining apparatus carries out the first machining for all the shapes and then continuously carries out the second machining and the third machining for each of the shapes.

In the example shown in FIG. 6, the remaining length is 600 meters and the total of the estimated consumed lengths in the three times of machining into the respective shapes is 510 meters. In this example, Formula (3) is satisfied and the wire 1 is sufficient in the three times of machining to be carried out.

In the example shown in FIG. 7, the remaining length is 400 meters and the total of the estimated consumed lengths in the three times of machining into the respective shapes is 510 meters. In this example, Formula (3) is not satisfied. The wire 1 is insufficient in the three times of machining to be carried out. From the display shown in FIG. 7, it is seen that the wire 1 runs out during the second (2nd) machining into a shape that is second in machining order. From such display, the operator can recognize that, if the wire bobbin 10 is replaced at a point when the third (3rd) machining into a shape that is first in the machining order ends, suspension of the machining due to the insufficiency of the wire 1 can be avoided and waste of the wire 1 is the smallest.

When the determination is made at step S4 that Formula (3) is not satisfied, the NC device 8 specifies, based on the estimated consumed length for each of the machining stages, the machining stage when the wire 1 runs out. The NC device 8 inserts, into a machining program, a machining stop code for stopping machining at a point when a machining stage immediately preceding the machining stage when the wire 1 runs out ends or a point immediately preceding the start of the machining stage when the wire 1 runs out.

As explained above, when the determination is made such that the estimated consumed length of the wire 1 exceeds the remaining length, the NC device 8 automatically performs an operation for inserting, into the machining program, the machining stop code for stopping the machining of the workpiece 2. The machining stop code is, for example, an M code "M01" or "M00". When the NC device 8 inserts the machining stop code, the wire discharge machining apparatus can prevent beforehand a situation in which the machining is suspended because of the insufficiency of the wire 1.

After the NC device 8 specifies the machining stage when the wire 1 runs out, the display unit 14 displays a message to the effect that the machining stop code is inserted (step S9). When the display unit 14 performs the display at step S6 or S9, the wire discharge machining apparatus ends the operation for determining whether the wire 1 is sufficient.

Note that the order of the display at the steps is not limited to the order explained in this embodiment and may be arbitrary. The display at the steps may be simultaneous. The NC device 8 may perform the insertion of the machining stop code according to the operation by the operator in addition to automatically performing the insertion of the machining stop code. In this case, the display unit 14 may display, together with the machining stage when the wire 1 runs out, a message for prompting the operator to insert the machining stop code.

Figure 8:
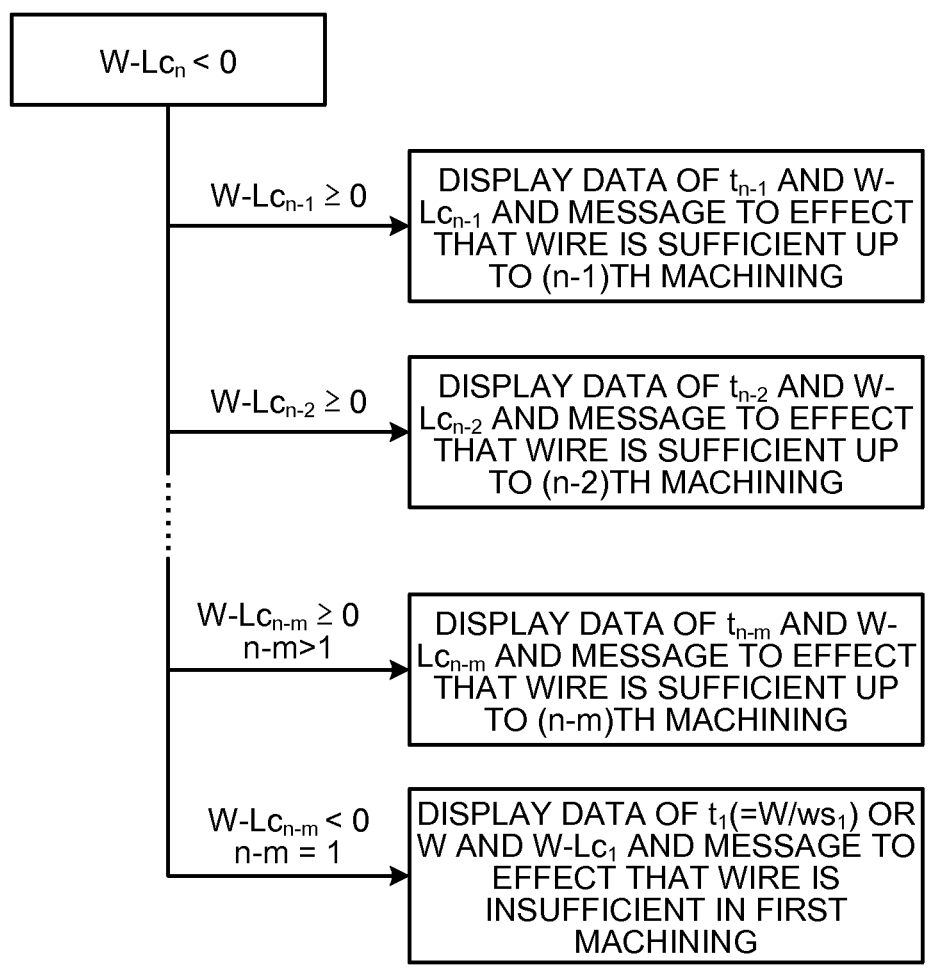
FIG. 8 is a diagram explaining a procedure for specifying a machining stage when a wire runs out.

FIG. 8 is a diagram explaining a procedure for specifying a machining stage when the wire runs out. According to the determination that Formula (3) is not satisfied, that is, $W-Lc_n<0$ is satisfied, the NC device 8 grasps that the wire 1 runs out before the nth machining ends.

Subsequently, the NC device 8 determines whether the wire 1 is sufficient up to the (n−1)th machining. When $W-Lc_{n-1} \geq 0$ is satisfied, the NC device 8 grasps that the wire 1 is sufficient up to the end of the (n−1)th machining and runs out during the nth machining. The NC device 8 specifies that the machining stage when the wire 1 runs out is the nth machining.

The NC device 8 inserts, into the machining program, the machining stop code for stopping the machining at a point when the (n−1)th machining ends or at a point immediately preceding the start of the nth machining. The NC device 8 sends, to the display unit 14, data of $t_{n-1}$ and $W-Lc_{n-1}$ and the determination result indicating that the wire 1 is sufficient up to the (n−1)th machining. The display unit 14 displays the data of $t_{n-1}$ and $W-Lc_{n-1}$ and a message to the effect that the wire 1 is sufficient up to the (n−1)th machining.

When $W-Lc_{n-1} \geq 0$ is not satisfied, the NC device 8 grasps that the wire 1 runs out before the (n−1)th machining ends. Subsequently, the NC device 8 determines whether the wire 1 is sufficient up to the (n−2)th machining. When $W-Lc_{n-2} \geq 0$ is satisfied, the NC device 8 grasps that the wire 1 is sufficient up to the end of the (n−2)th machining and runs out during the (n−1)th machining. The NC device 8 specifies that the machining stage when the wire 1 runs out is the (n−1)th machining.

The NC device 8 inserts, into the machining program, a machining stop code for stopping the machining at a point when the (n−2)th machining ends or a point immediately before the start of the (n−1)th machining. The NC device 8 sends, to the display unit 14, data of $t_{n-2}$ and $W-Lc_{n-2}$ and the determination result indicating that the wire 1 is sufficient up to the (n−2)th machining. The display unit 14 displays the data of $t_{n-2}$ and $W-Lc_{n-2}$ and a message to the effect that the wire 1 is sufficient up to the (n−2)th machining.

After the determination that $W-Lc_{n-2} \geq 0$ is not satisfied, the NC device 8 continues the operation according to a procedure same as the procedure explained above. When $W-Lc_{n-m} \geq 0$ and n−m>1 are satisfied, the NC device 8 grasps that the wire 1 is sufficient up to the end of the (n−m)th machining and runs out during the (n−m+1)th machining. The NC device 8 specifies that the machining stage when the wire 1 runs out is the (n−m+1)th machining.

The NC device 8 inserts, into the machining program, a machining stop code for stopping the machining at a point when the (n−m)th machining ends or a point immediately preceding the start of the (n−m+1)th machining. The NC device 8 sends, to the display unit 14, data of $t_{n-m}$ and $W-Lc_{n-m}$ and the determination result indicating that the wire 1 is sufficient up to the (n−m)th machining. The display unit 14 displays the data of $t_{n-m}$ and $W-Lc_{n-m}$ and a message to the effect that the wire 1 is sufficient up to the (n−m)th machining.

When at least one of $W-Lc_{n-m} \geq 0$ and n−m>1 is not satisfied, the NC device 8 grasps that the wire 1 runs out before the first machining ends ($W-Lc_{n-m}<0$ and n−m=1). The NC device 8 specifies that the machining stage when the wire 1 runs out is the first machining.

The NC device 8 sends, to the display unit 14, data of $t_1 (=W/ws_1)$ or W and $W-Lc_1$ and the determination result indicating that the wire 1 is insufficient in the first machining. The display unit 14 displays the data of $t_1$ or W and $W-Lc_1$ and a message to the effect that the wire 1 is insufficient in the first machining.

As shown in FIG. 4 to FIG. 7, the wire discharge machining apparatus displays information concerning the remaining length of the wire and information concerning the estimated consumed length together with information representing the progress of the machining stages. The operator can easily determine, by viewing graphic display by the display unit 14, in which machining stage the operator should replace the wire bobbin 10.

Accordingly, the wire discharge machining apparatus can attain an effect that it is possible to prevent machining from being suspended because of the insufficiency of the wire 1 and use the wire 1 without waste by clearly indicating the timing for replacing the wire bobbin 10 to the operator.

When suspension of the machining due to the insufficiency of the wire 1 occurs, the wire discharge machining apparatus sometimes causes machining streaks on the workpiece 2. The wire discharge machining apparatus can suppress quality deterioration of a machined product due to machining streaks by preventing a situation in which machining is suspended because of the insufficiency of the wire 1.

The wire discharge machining apparatus can also reduce loss of time due to suspension of the machining by preventing suspension of the machining due to the insufficiency of the wire 1. In machining affected by a temperature change, such as pitching, the wire discharge machining apparatus can also suppress a machining failure due to the temperature change by preventing suspension of the machining.

When it is difficult to determine whether the wire 1 is sufficient in the subsequent machining, the operator sometimes removes the wire bobbin 10 irrespective of the fact that the wire 1 sufficiently remains. In this case, because it is difficult to exhaust the wire 1 without waste, excess costs are incurred. According to the present invention, in the wire discharge machining apparatus, because the operator can clearly determine whether the wire 1 is sufficient in the subsequent machining, it is possible to exhaust the wire 1 without waste. The operator can easily determine, from display by the display unit 14, whether the wire 1 is sufficient without the bother of performing calculation by hand.

Note that, in the wire discharge machining apparatus, display on the display unit 14 may be changed as appropriate from the display in this embodiment. The display unit 14 may display the information concerning each of the remaining length and the estimated consumed length in any form other than the graph as long as it is visually recognizable. The display unit 14 may display the information concerning each of the remaining length and the estimated consumed length as graphics other than the graph, for example, a figure or the like drawn along a machining track indicated by the machining program.

The display unit 14 only has to graphically display the information concerning each of the remaining length and the estimated consumed length together with the information representing the progress of the machining stages and may omit display as appropriate concerning the other data.

Second Embodiment

Figure 9:
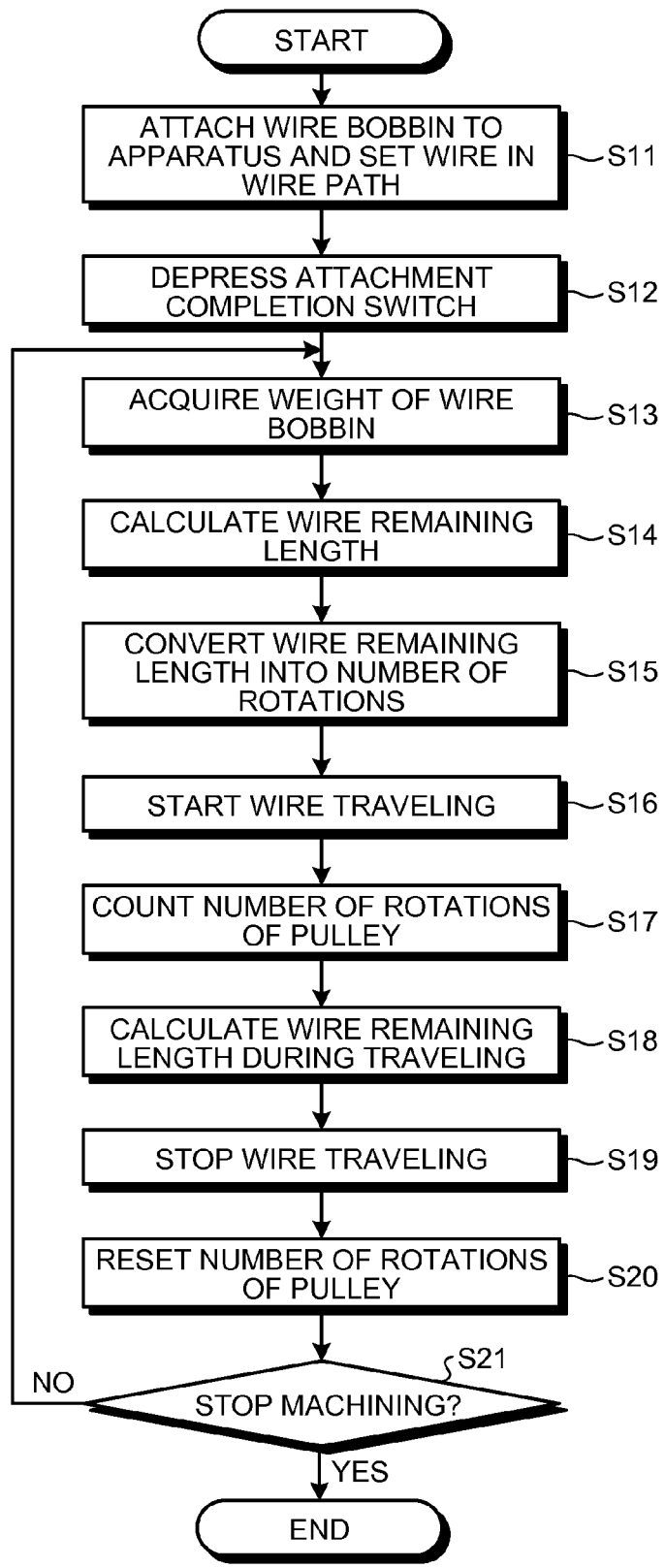
FIG. 9 is a flowchart explaining a procedure for calculating the remaining length of a wire in a wire discharge machining apparatus according to a second embodiment of the present invention.

In a second embodiment, one of examples for calculating the remaining length of a wire is explained. FIG. 9 is a flowchart showing a procedure for calculating the remaining length of a wire in a wire discharge machining apparatus according to the second embodiment of the present invention. The wire discharge machining apparatus according to this embodiment has the same configuration as the wire discharge machining apparatus according to the first embodiment (see FIG. 1).

In this embodiment, the wire-remaining-length calculating unit 21 calculates the remaining length of the wire 1 when the wire 1 is stopped being paid out from the wire bobbin 10 and when the wire 1 is paid out from the wire bobbin 10 by driving by the wire travelling device 11.

At step S11, an operator attaches the wire bobbin 10 to the wire discharge machining apparatus. The operator sets the wire 1 in a wire path. At step S12, the operator inputs, to the wire discharge machining apparatus, completion of the attachment of the wire 1 by, for example, depressing an attachment completion switch (not shown in the figures).

When the wire discharge machining apparatus detects a signal by the depression of the attachment completion switch, the wire discharge machining apparatus measures the weight of the wire bobbin 10 attached to the wire discharge machining apparatus. According to such measurement, the wire discharge machining apparatus acquires the weight of the wire bobbin 10 at the time when the wire 1 is stopped being paid out (step S3). The wire discharge machining apparatus measures the weight of the wire bobbin 10 using, for example, a weight measuring function included in a wire-bobbin attaching section (not shown in the figures).

At step S14, the wire-remaining-length calculating unit 21 calculates the remaining length of the wire 1 using the weight of the wire bobbin 10. The wire-remaining-length calculating unit 21 calculates the remaining length (W) according to, for example, Formula (4) described below.

$$W=(BW-Bb)/Ww \quad (4)$$

As explained above, when the wire 1 is stopped being paid out, the wire-remaining-length calculating unit 21 calculates the remaining length using the result obtained by measuring the weight of the wire bobbin 10.

Note that, in Formula (4), BW represents the weight of the wire bobbin 10 acquired at step S13. Bb represents the weight of the wire bobbin 10 around which the wire 1 is not wound. Ww represents the weight of the wire 1 per unit length. For example, Bb and Ww are retained in the wire discharge machining apparatus in advance. Bb and Ww can be input to the wire discharge machining apparatus by the operator when the wire bobbin 10 is attached at step S11.

At step S15, the wire-remaining-length calculating unit 21 converts the calculated remaining length into the number of rotations of a pulley (not shown in the figures). The pulley rotates when the wire 1 is paid out and counts the number of rotations. The pulley is provided on the wire path between the wire bobbin 10 and the tension applying mechanism 9.

The wire-remaining-length calculating unit 21 divides the remaining length of the wire 1 by the peripheral length $D\pi$ (D represents the diameter of the pulley) of the pulley to calculate the number of rotations corresponding to the remaining length. The wire discharge machining apparatus carries out the operation from step S13 to step S15 not only when the wire bobbin 10 is attached but also every time a stop signal for stopping traveling of the wire 1 is received.

At step S16, the wire travelling device 11 causes the wire 1 to start to travel. While the wire travelling device 11 causes the wire 1 to travel, the pulley counts the number of rotations (step S17).

At step S18, the wire-remaining-length calculating unit 21 calculates the remaining length of the wire 1 during the traveling. The wire-remaining-length calculating unit 21 calculates the difference between the number of rotations calculated at step S15 and the number of rotations of the pulley after the traveling of the wire 1 is started. The wire-remaining-length calculating unit 21 multiplies the difference by the peripheral length $D\pi$ of the pulley to calculate the remaining length of the wire 1. Note that the length obtained by multiplying the number of rotations of the pulley after the traveling of the wire 1 is started by the peripheral length $D\pi$ is equivalent to the usage of the wire 1 after the traveling of the wire 1 is started.

As explained above, when the wire 1 is paid out, the wire-remaining-length calculating unit 21 calculates the remaining length using the result obtained by counting the number of rotations of the pulley provided on the path to which the wire 1 is paid out.

In the wire discharge machining apparatus, it is difficult to accurately measure the weight of the wire bobbin 10 while the wire 1 is paid out from the wire bobbin 10. The wire-remaining-length calculating unit 21 can accurately calculate the remaining length during the traveling of the wire 1 using, for the calculation of the remaining length, the result obtained by counting the number of rotations of the pulley. The wire-remaining-length calculating unit 21 repeats the calculation of the remaining length of the wire 1 until the wire travelling device 11 stops the traveling of the wire 1.

Conventionally, the wire discharge machining apparatus sometimes calculates the usage of the wire 1 based on the result obtained by counting the number of rotations of a rotary roller provided in the wire travelling device 11. The rotary roller tows the wire 1 in a stage when the wire 1 is collected in the wire collection container 12. The wire 1 worn by the electric discharge sometimes slips on the rotary roller. When the wire 1 worn by the electric discharge is broken, the rotary roller sometimes excessively rotates until the rotary roller stops after wire breakage is detected. In this way, when the number of rotations of the rotary roller provided in the wire travelling device 11 is counted, there is a problem in that an error tends to occur in the calculation of the usage of the wire 1.

In this embodiment, in the wire discharge machining apparatus, the pulley is provided at a position where the wire 1 before being worn by the electric discharge passes and the number of rotations of the pulley is counted. Accordingly, the wire discharge machining apparatus can accurately calculate the usage of the wire 1.

The wire travelling device 11 stops traveling of the wire 1 according to a stop signal (step S19). The wire discharge machining apparatus resets the number of rotations of the pulley (step S20). When it is determined that the machining is stopped (Yes at step S21), the wire discharge machining apparatus ends the operation for calculating the remaining length of the wire. When the machining is continued (No at step S21), the wire discharge machining apparatus repeats the operation from the step S13.

According to this embodiment, the wire discharge machining apparatus can accurately calculate the remaining length of the wire 1 when traveling of the wire 1 is stopped and while the wire 1 is caused to travel.

Third Embodiment

Figure 10:
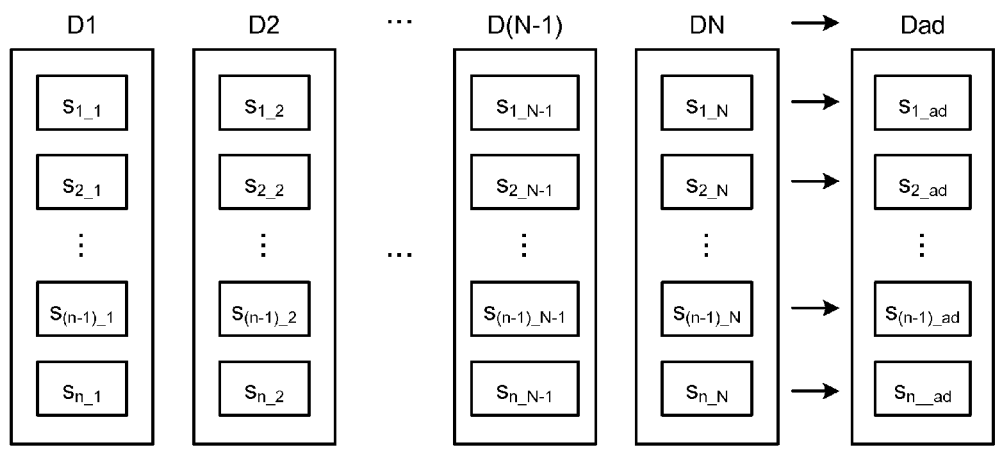
FIG. 10 is a diagram explaining calculation of the estimated machining speed in a wire discharge machining apparatus according to a third embodiment.

In a third embodiment, a first example concerning calculation of the estimated machining speed is explained. FIG. 10 is a diagram explaining calculation of the estimated machining speed in a wire discharge machining apparatus according to the third embodiment. The wire discharge machining apparatus according to this embodiment has the same configuration as the wire discharge machining apparatus according to the first embodiment (see FIG. 1).

The NC device 8 retains machining result data D1, D2, . . . , D(N−1), and DN acquired in the machining in the past. D1 represents machining result data in machining carried out in the first time. D1 includes actual machining speeds $s_{1\_1}, s_{2\_1}, \ldots, s_{(n-1)\_1}$, and $s_{n\_1}$ in machining stages in n times of machining. D2 represents machining result data in machining carried out in the second time. D2 includes actual machining speeds $s_{1\_2}, s_{2\_2}, \ldots, s_{(n-1)\_2}$, and $s_{n\_2}$ in the machining stages in the n times of machining.

D(N−1) represents machining result data in machining carried out in the (N−1)th time. D(N−1) includes actual machining speeds $s_{1\_N-1}, s_{2\_N-1}, \ldots, s_{(n-1)\_N-1}$, and $s_{n\_N-1}$ in the machining stages in the n times of machining. DN represents machining result data in machining carried out in the Nth time. DN includes actual machining speeds $s_{1\_N}, s_{2\_N}, \ldots, s_{(n-1)\_N}$, and $S_{n\_N}$.

The wire-consumed-length calculating unit 23 calculates machining result average data Dad of the machining result data D1, D2, . . . , D(N−1), and DN. The machining result average data Dad includes average values $s_{1\_ad}, s_{2\_ad}, \ldots, s_{(n-1)\_ad}$, and $s_{n\_ad}$ of the actual machining speeds in the machining stages of the n times of machining.

The wire-consumed-length calculating unit 23 calculates, for example, the average value $s_{n\_ad}$ of the actual machining speeds in the nth machining according to Formula (5) described below.

$$S_{n\_ad}=(s_{n\_1}+s_{n\_2}+ \ldots +s_{n\_N-1}+s_{n\_N})/N \quad (5)$$

Concerning the machining stages from the first time to the (n−1)th time, the wire-consumed-length calculating unit 23 calculates actual machining speeds $s_{1\_ad}$ to $s_{n-1)\_ad}$ in the same manner as in the case of the nth time. In this way, the wire-consumed-length calculating unit 23 uses, as the estimated machining speed used for calculation of the estimated consumed length of the wire 1, the average value of the actual machining speeds acquired in machining in the past. The wire-consumed-length calculating unit 23 updates, every time machining result data is accumulated, the average value used as the estimated machining speed.

Concerning a plurality of times of machining, an error occurs in some cases in the estimated consumed length calculated by the wire-consumed-length calculating unit 23 with respect to the actual consumed length. As causes of the error, various conditions, such as planning of machining by an operator, the state of the workpiece 2, and the work environment, are conceivable.

According to this embodiment, the wire discharge machining apparatus updates the estimated machining speeds in stags of the plurality of times of machining based on a history of machining carried out in the past. Therefore, the wire-consumed-length calculating unit 23 can obtain the estimated consumed length with less error with respect to the actual consumed length by using, for calculation of the estimated consumed length, the estimated machining speeds updated based on the results in the past. The wire discharge machining apparatus can accurately grasp, by accurately estimating the consumed length of the wire 1, a machining stage when the wire 1 runs out.

As in the calculation of the estimated consumed length in the wire-consumed-length calculating unit 23, the machining-time calculating unit 22 may use, for calculation of the machining time, the average value of the actual machining speeds acquired in the machining in the past. Accordingly, the wire discharge machining apparatus can accurately estimate the machining time.

Fourth Embodiment

Figure 11:
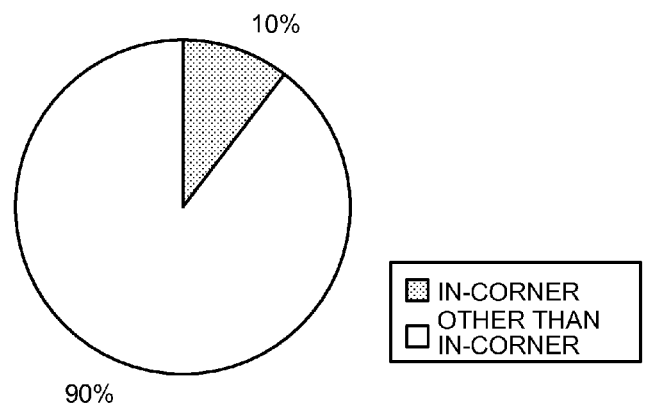
FIG. 11 is a diagram explaining calculation of the estimated machining speed in a wire discharge machining apparatus according to a fourth embodiment.

In the fourth embodiment, a second example concerning calculation of the estimated machining speed is explained. FIG. 11 is a diagram explaining calculation of the estimated machining speed in a wire discharge machining apparatus according to the fourth embodiment. The wire discharge machining apparatus according to this embodiment has the same configuration as the wire discharge machining apparatus according to the first embodiment (see FIG. 1).

The wire-consumed-length calculating unit 23 calculates the ratio of an in-corner (an internal angle portion) to the machining peripheral length. An example shown in FIG. 11 indicates that the wire-consumed-length calculating unit 23 calculates the ratio of the in-corner as 10% of the entire machining peripheral length.

The wire-consumed-length calculating unit 23 corrects the estimated machining speed such that the estimated machining speed is lower as the ratio of the in-corner is larger. In this way, the wire-consumed-length calculating unit 23 uses, for calculation of the estimated consumed length, the estimated machining speed corrected according to the ratio of the in-corner to the machining peripheral length.

In a plurality of times of machining, even if the machining peripheral length is the same, the machining time is different according to the machining shape. In particular, as the machining shape has more in-corners, because the machining direction is controlled in corner portions, the machining speed is lower. When the consumed length of the wire 1 is estimated using the uniform estimated machining speed irrespective of the machining shape, as a fall in the actual machining speed is more conspicuous, the actual consumed length of the wire 1 is longer than the estimation.

According to this embodiment, the wire-consumed-length calculating unit 23 can calculate the estimated consumed length that takes into account a fall in the machining speed by correcting the estimated machining speed according to the ratio of the in-corner to the machining peripheral length. The wire discharge machining apparatus can accurately grasp, by accurately estimating the consumed length of the wire 1, a machining stage when the wire 1 runs out.

As in the calculation of the estimated consumed length in the wire-consumed-length calculating unit 23, the machining-time calculating unit 22 may use, for calculation of the machining time, the estimated machining speed corrected according to the ratio of the in-corner to the machining peripheral length. Accordingly, the wire discharge machining apparatus can accurately estimate the machining time.

Fifth Embodiment

Figure 12:
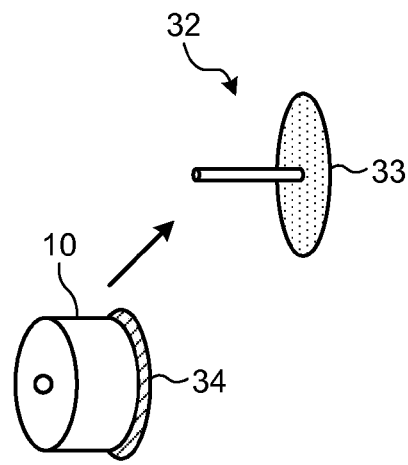
FIG. 12 is a diagram of a wire bobbin and a wire-bobbin attaching section.
Figure 13:
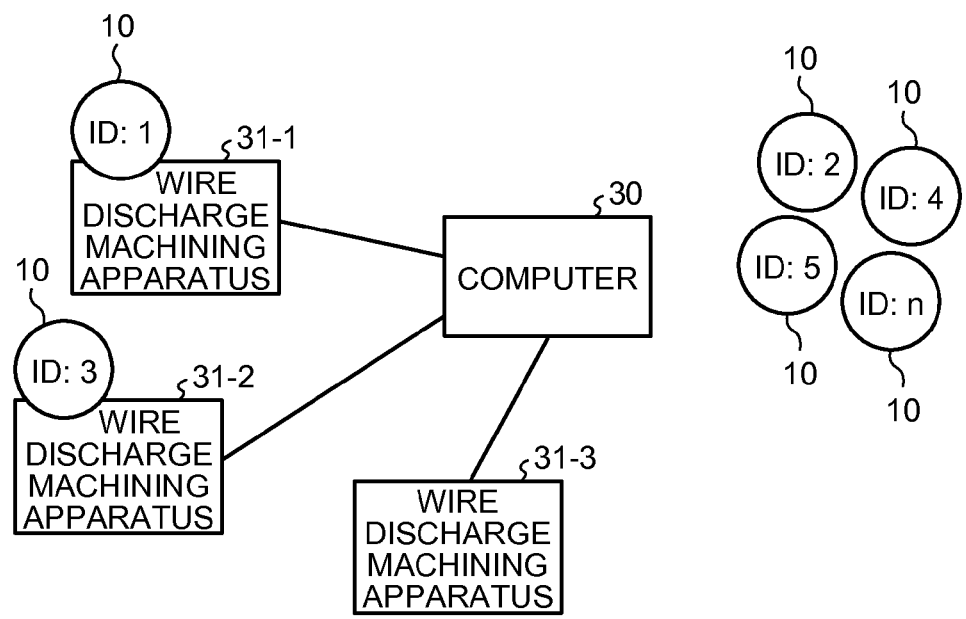
FIG. 13 is a diagram of the schematic configuration of a system including the wire discharge machining apparatuses and the wire bobbins managed by the system.

In a fifth embodiment, an example is explained in which a wire bobbin is managed in a system including a wire discharge machining apparatus. FIG. 12 and FIG. 13 are diagrams explaining management of wire bobbins in a system including wire discharge machining apparatuses according to the fifth embodiment of the present invention. Wire discharge machining apparatuses 31-1, 31-2, and 31-3 according to this embodiment have the same configuration as the wire discharge machining apparatus according to the first embodiment (see FIG. 1).

FIG. 12 is a diagram of a wire bobbin and a wire-bobbin attaching section. An ID retaining section 34 is attached to the wire bobbin 10. The ID retaining section 34 retains a wire bobbin ID. The wire bobbin ID is identification information given for each of the wire bobbins 10.

A wire-bobbin attaching section 32 is provided in each of the wire discharge machining apparatuses 31-1, 31-2, and 31-3. The wire-bobbin attaching section 32 includes an ID reading section 33. When the wire bobbin 10 is attached to the wire-bobbin attaching section 32, the ID reading section 33 reads the wire bobbin ID from the ID retaining section 34.

FIG. 13 is a diagram of the schematic configuration of the system including the wire discharge machining apparatuses and the wire bobbins managed by the system. The system includes the wire discharge machining apparatuses 31-1, 31-2, and 31-3 and a computer 30. The computer 30 manages the wire discharge machining apparatuses 31-1, 31-2, and 31-3.

The computer 30 is communicably connected to the wire discharge machining apparatuses 31-1, 31-2, and 31-3. The computer 30 and the wire discharge machining apparatuses 31-1, 31-2, and 31-3 are connected via, for example, a network.

The computer 30 retains, concerning a plurality of the wire bobbins 10, wire bobbin IDs (ID:1 to ID:n) and information concerning the remaining lengths of the wires 1 in the wire bobbins 10 in association with each other. The computer 30 updates the retained information concerning the remaining length every time the remaining lengths of the wires 1 are calculated in the wire discharge machining apparatuses 31-1, 31-2, and 31-3.

As explained above, the computer 30 manages the information concerning the remaining lengths calculated by the wire-remaining-length calculating units 21 of the wire discharge machining apparatuses 31-1, 31-2, and 31-3 in association with the wire bobbin ID given to each of the wire bobbins 10.

In an example shown in FIG. 13, the wire bobbin 10 with ID:1 is attached to the wire discharge machining apparatus 31-1. The wire bobbin 10 with ID:3 is attached to the wire discharge machining apparatus 31-2. When the remaining length of the wire 1 is calculated by the wire-remaining-length calculating unit 21 of the wire discharge machining apparatus 31-1, the computer 30 updates the information concerning the remaining length retained concerning ID:1. When the remaining length of the wire 1 is calculated by the wire-remaining-length calculating unit 21 of the wire-discharge machining apparatus 31-2, the computer 30 updates the information concerning the remaining length retained concerning ID:3.

The wire bobbin IDs and the information concerning the remaining lengths of the wires 1 retained in the computer 30 are displayed on, for example, a display of the computer 30. The display units 14 of the wire discharge machining apparatuses 31-1, 31-2, and 31-3 display these pieces of information acquired from the computer 30 via a network or the like. An operator grasps the information concerning the remaining lengths of the wires 1 in the wire bobbins 10 from the display on the display of the computer 30 or the display units 14 of the wire discharge machining apparatuses 31-1, 31-2, and 31-3.

According to this embodiment, as in the case of the other embodiments, the wire discharge machining apparatuses 31-1, 31-2, and 31-3 can compare the remaining lengths and the estimated consumed lengths in the wires 1 in the wire bobbins 10 currently attached to the wire discharge machining apparatuses 31-1, 31-2, and 31-3. Further, according to this embodiment, the wire discharge machining apparatuses 31-1, 31-2, and 31-3 can also compare the remaining lengths of the wires 1 in all the wire bobbins 10 managed by the system and the estimated consumed lengths in the subsequent machining.

Accordingly, the wire discharge machining apparatuses 31-1, 31-2, and 31-3 can easily select, out of the wire bobbins 10 managed by the system, the wire bobbins 10 with which the wires 1 can be used without insufficiency and without waste in the subsequent machining. The wire discharge machining apparatuses 31-1, 31-2, and 31-3 may be configured to specify, according to the estimated consumed lengths, the wire bobbins 10 having the remaining lengths most suitable for the subsequent machining and display the wire bobbin IDs of the wire bobbins 10 on the display units 14.

The operator can save labor and time for finding, out of the plurality of wire bobbins 10, the wire bobbins 10 suitable for the subsequent machining in the wire discharge machining apparatuses 31-1, 31-2, and 31-3. The operator can easily grasp, for example, the situations of the wire bobbins 10 managed in the system of an entire factory. Therefore, it is possible to simplify the management of the wire bobbins 10.

Note that the information concerning the remaining lengths of the wires 1 in the wire bobbins 10 may be retained in the ID retaining section 34 of each of the wire bobbins 10 besides being retained in the computer 30.

When the wire-remaining-length calculating unit 21 calculates the remaining lengths of the wires 1, the wire discharge machining apparatuses 31-1, 31-2, and 31-3 update the information concerning the remaining lengths retained in the ID regaining sections 34.

Sixth Embodiment

Figure 14:
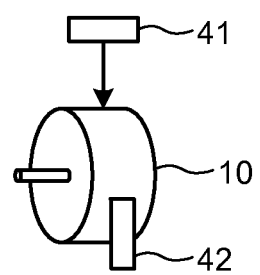
FIG. 14 is a diagram explaining the configuration for detecting the remaining state of a wire in a wire discharge machining apparatus according to a sixth embodiment of the present invention.

In a sixth embodiment, an example is explained in which the remaining state of the wire 1 in the wire bobbin 10 attached to a wire discharge machining apparatus is detected. FIG. 14 is a diagram explaining the configuration for detecting the remaining state of a wire in a wire discharge machining apparatus according to the sixth embodiment of the present invention.

The wire discharge machining apparatus according to this embodiment has the same configuration as the wire discharge machining apparatus according to the first embodiment (see FIG. 1). The wire discharge machining apparatus further includes, as a component for detecting the remaining state of the wire 1, one of a photosensor 41 and a conduction sensor 42.

The photosensor 41 emits light to the wire bobbin 10 attached to the wire discharge machining apparatus. The photosensor 41 detects the light reflected on the wire bobbin 10. The photosensor 41 detects the remaining state of the wire 1 in the wire bobbin 10 according to a change in the reflected light from the wire bobbin 10.

In the wire bobbin 10, as the wire 1 gradually decreases, the core portion around which the wire 1 is wound appears. A part of the light reflected on the wire 1 when a sufficient quantity of the wire 1 is wound around the wire bobbin 10 is reflected on the core portion. Consequently, the amount of the reflected light advancing to the photosensor 41 changes. For example, when the reflectance of the core portion is lower than the reflectance of the wire 1, the amount of light detected by the photosensor 41 decreases because the core portion appears.

When a conspicuous change occurs in the reflected light from the wire bobbin 10, the photosensor 41 detects that the wire 1 remaining in the wire bobbin 10 is little. In this way, the photosensor 41 detects the remaining state of the wire 1 according to the change in the reflected light from the wire bobbin 10.

When the photosensor 41 detects that the wire 1 remaining in the wire bobbin 10 is little, the wire discharge machining apparatus stops the driving of the wire travelling device 11, for example, at the timing when the present machining stage is switched to the next machining stage. Accordingly, even when the actual consumed length of the wire 1 is longer than estimation, the wire discharge machining apparatus can stop the machining before the wire 1 completely runs out from the wire bobbin 10.

The conduction sensor 42 detects conduction that occurs by contact with the wire 1. The conduction sensor 42 is attached at a position where the conduction sensor 42 can come into contact with the wire 1 wound around the wire bobbin 10 attached to the wire discharge machining apparatus.

The conduction sensor 42 detects, according to the presence or absence of conduction, the remaining state of the wire 1 in the wire bobbin 10. When the wire 1 wound around the wire bobbin 10 gradually decreases and the conduction stops, the conduction sensor 42 detects that the wire 1 remaining in the wire bobbin 10 is little.

When the conduction sensor 42 detects that the wire 1 remaining in the wire bobbin 10 is little, the wire discharge machining apparatus stops the driving of the wire travelling device 11, for example, at the timing when the present machining stage is switched to the next machining stage. Accordingly, even when the actual consumed length of the wire 1 is longer than estimation, the wire discharge machining apparatus can stop the machining before the wire 1 completely runs out from the wire bobbin 10.

Note that the wire discharge machining apparatus may be obtained by combining as appropriate the configurations explained in the first to sixth embodiments.

REFERENCE SIGNS LIST 1 wire, 2 workpiece, 3 table, 4 power supply for machining, 5 inter-pole detecting circuit, 6 servo motor, 7 servo amplifier, 8 NC device, 9 tension applying mechanism, 10 wire bobbin, 11 wire travelling device, 12 wire collection container, 13a, 13b machining liquid nozzles, 14 display unit, 21 wire-remaining-length calculating unit, 22 machining-time calculating unit, 23 wire-consumed-length calculating unit, 30 computer, 31-1, 31-2, 31-3 wire discharge machining apparatuses, 32 wire-bobbin attaching section, 33 ID reading section, 34 ID retaining section, 41 photosensor, 42 conduction sensor.

The invention claimed is:

1. A wire discharge machining apparatus that causes an electric discharge between a wire and a workpiece and machines the workpiece, the apparatus comprising:
   a numerical control unit that carries out numerical control of the wire discharge machining apparatus according to a machining program; and
   a display unit that displays information concerning machining of the workpiece by the wire discharge machining apparatus, wherein
   the numerical control unit includes
      a wire-remaining-length calculating unit that calculates a length of the wire remaining in a wire bobbin attached to the wire discharge machining apparatus, and
      a wire-consumed-length calculating unit that calculates an estimated length of the wire used for machining of the workpiece,
   the display unit displays, as a graphic, information concerning a remaining length that is a calculation result in the wire-remaining-length calculating unit and information concerning an estimated consumed length that is a calculation result in the wire-consumed-length calculating unit, and adds information representing a progress of a machining stage to the information concerning the estimated consumed length, and
   the wire-consumed-length calculating unit calculates the estimated consumed length based on a machining peripheral length, an estimated machining speed, and a wire feeding speed in each machining stage and uses, as the estimated machining speed used for calculation of the estimated consumed length, an average value of actual machining speeds acquired in machining in past.

2. A wire discharge machining apparatus that causes an electric discharge between a wire and a workpiece and machines the workpiece, the apparatus comprising:
   a numerical control unit that carries out numerical control of the wire discharge machining apparatus according to a machining program; and
   a display unit that displays information concerning machining of the workpiece by the wire discharge machining apparatus, wherein
   the numerical control unit includes
      a wire-remaining-length calculating unit that calculates a length of the wire remaining in a wire bobbin attached to the wire discharge machining apparatus, and
      a wire-consumed-length calculating unit that calculates an estimated length of the wire used for machining of the workpiece,
   the display unit displays, as a graphic, information concerning a remaining length that is a calculation result in the wire-remaining-length calculating unit and information concerning an estimated consumed length that is a calculation result in the wire-consumed-length calculating unit, and adds information representing a progress of a machining stage to the information concerning the estimated consumed length, and
   the wire-consumed-length calculating unit calculates the estimated consumed length based on a machining peripheral length, an estimated machining speed, and a wire feeding speed in each machining stage and uses, for calculation of the estimated consumed length, the estimated machining speed corrected according to a ratio of an in-corner to the machining peripheral length.

3. A wire discharge machining apparatus that causes an electric discharge between a wire and a workpiece and machines the workpiece, the apparatus comprising:
   a numerical control unit that carries out numerical control of the wire discharge machining apparatus according to a machining program;
   a display unit that displays information concerning machining of the workpiece by the wire discharge machining apparatus; and
   a conduction sensor that detects conduction caused by contact with the wire, wherein the numerical control unit includes
- a wire-remaining-length calculating unit that calculates a length of the wire remaining in a wire bobbin attached to the wire discharge machining apparatus, and
- a wire-consumed-length calculating unit that calculates an estimated length of the wire used for machining of the workpiece, the display unit displays, as a graphic, information concerning a remaining length that is a calculation result in the wire-remaining-length calculating unit and information concerning an estimated consumed length that is a calculation result in the wire-consumed-length calculating unit, and adds information representing a progress of a machining stage to the information concerning the estimated consumed length, and the conduction sensor is attached at a position where the conduction sensor is capable of coming into contact with the wire wound around the wire bobbin attached to the wire discharge machining apparatus.

* * * * *